US007086792B1

(12) United States Patent
Pangrazio et al.

(10) Patent No.: US 7,086,792 B1
(45) Date of Patent: Aug. 8, 2006

(54) COMBINING A SET OF IMAGES INTO A SINGLE DOCUMENT IMAGE FILE HAVING A VERSION KEY AND A COLOR PLANE ASSOCIATED THEREWITH

(75) Inventors: Donald M. Pangrazio, LeRoy, NY (US); Anthony J. Leone, III, Pittsford, NY (US); Ann Cecchi, Webster, NY (US); Katherine Loj, Rochester, NY (US); Michael Evan, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 11/222,061

(22) Filed: Sep. 8, 2005

(51) Int. Cl.
*B41J 5/30* (2006.01)
*G06K 15/00* (2006.01)

(52) U.S. Cl. ........................ 400/62; 358/1.12

(58) Field of Classification Search ............... 400/62; 101/211, 484, 483, 477, 181; 358/1.12, 1.15, 358/1.18; 715/723, 771, 530, 505, 513, 517, 715/500, 515; 345/502, 584
See application file for complete search history.

(56) References Cited

U.S. PATENT DOCUMENTS

| 4,692,757 A * | 9/1987 | Tsuhara et al. ............ 345/636 |
| 5,519,852 A * | 5/1996 | Noy ........................... 703/27 |
| 5,796,411 A | 8/1998 | Cyman et al. .............. 345/502 |
| 5,806,430 A * | 9/1998 | Rodi ......................... 101/484 |
| 5,926,185 A | 7/1999 | Vyncke et al. ............. 345/619 |
| 5,963,968 A * | 10/1999 | Warmus et al. ............. 715/517 |
| 5,992,324 A | 11/1999 | Rombult et al. ............ 101/477 |
| 5,995,719 A | 11/1999 | Bourdead'hui et al. ..... 358/1.12 |
| 6,012,070 A * | 1/2000 | Cheng et al. ............... 715/505 |
| 6,049,390 A * | 4/2000 | Notredame et al. ........ 358/1.15 |
| 6,075,614 A * | 6/2000 | Ohtsuka et al. .............. 358/1.1 |
| 6,363,418 B1 * | 3/2002 | Conboy et al. ............. 709/218 |
| 6,584,903 B1 | 7/2003 | Jacobs ........................ 101/484 |
| 6,590,675 B1 * | 7/2003 | Tomiyasu .................. 358/1.18 |
| 6,624,909 B1 * | 9/2003 | Czyszczewski et al. ... 358/1.17 |
| 6,672,212 B1 | 1/2004 | Ferlitsch ..................... 101/484 |
| 6,684,789 B1 | 2/2004 | Krautter ..................... 101/484 |
| 6,688,229 B1 | 2/2004 | Eisele et al. ................ 101/483 |
| 6,688,230 B1 | 2/2004 | Goh et al. ................... 101/484 |
| 6,708,309 B1 * | 3/2004 | Blumberg ................... 715/530 |
| 6,880,458 B1 | 4/2005 | Munz et al. ................ 101/211 |
| 6,992,789 B1 * | 1/2006 | Czyszczewski et al. ... 358/1.18 |
| 2002/0178950 A1 * | 12/2002 | Delhoune et al. .......... 101/481 |
| 2002/0191220 A1 * | 12/2002 | Czyszczewski et al. ... 358/1.18 |
| 2005/0066279 A1 * | 3/2005 | LeBarton et al. ........... 715/723 |

OTHER PUBLICATIONS

O'Brien, Katherine; Maximizing productivity: a textbook example—the Von Hoffman Press and the Barco Graphics system—Productivity; American Printer, Aug. 1997.

(Continued)

*Primary Examiner*—Minh Chau
*Assistant Examiner*—Wasseem H. Hamdan
(74) *Attorney, Agent, or Firm*—Basch & Nickerson LLP; Diane C. Basch

(57) ABSTRACT

Disclosed are systems and methods for compiling a set of images into a single document image file having a version key and a color plane associated therewith. The version key is employed in association with the images and color planes to cause a raster image processor to select, or ignore, color planes and thereby enable printing of a plurality of multi-versioned documents from a common image file set.

18 Claims, 9 Drawing Sheets

OTHER PUBLICATIONS

Barco Graphics at Grafex Jan. 24-27, 2001—Stockholm Massan—Stand C0.6.50.

Mohan, Anne Marie, Senior Editor; Digital printing cheers wine-maker China Bend Vineyards crushes label-printing costs and enhances the bouquet of its wine label graphics, Packaging Digest, Oct. 2001 p. 80.

Tandem Design, Inc. 1994 Present; Comparison to Other Printing Processes No date provided.

Digital Press Prompts Variable Data Market Move; Drukkerij Deko, a traditional offset printer, has installed a Kodak Nexpress 2100 digital colour press. News from: NexPress Solutions; Edited on Apr. 25, 2005.

Digital Offset Printing; Erawan inter@ctive Co., Ltd,Bangkok Lialson Office, 119/68, Moo 3, Soi Siamthoranee,Kubon Rd., Tarang, Bang Khen, Bangkok 10220. Thailand. publication date was not provided.

Accent Photo Imaging; Indigo digital variable data printing; Digital Offset Printing; Accent Photo Imaging, 4685 Centennial Blvd. Colorado Springs, CO 80919. publication date was not provided.

Monkerud, Don; PODi Pioneers a New Approach to Variable-Data Printing; Digital Output; publication date was not provided.

Variable Sleeve Offset Printing to Open Packaging Market? Jul. 4, 2004; Print On Demand Com.

Monkerud, Don; Rediscovering a Mission: Using Variable Data to Communicate; May 2003, Digital Publishing Solutions.

* cited by examiner

```
1  %!
2  %% Copyright (c) Xerox Corporation.  All Rights Reserved.
3  %% Let's say the separation name we want is mo_magenta
4  %% copy to /var/spool/XRXnps/vipp
5
6  /XRXSep_Name (mo_magenta) def
7
8  %% redefine setcolor space to look for Separation color spaces and make
9  %% them invisible if they are NOT mo_magenta
10 %% We do this by changing the separation name to "None" when it's not
11 %% XRXSep_Name
12
13 /setcolorspace {
14
15         dup type /arraytype eq {
16
17                 dup 0 get /Separation eq {
18
19                         dup 1 get dup XRXSep_Name ne exch (Black) ne and {
20
21                                 dup 1 (None) put
22
23                         }if
24
25                 }if
26         }if
27
28
29
30         systemdict begin setcolorspace end
31
32 }bind def
33
```

FIG. 8

COMBINING A SET OF IMAGES INTO A SINGLE DOCUMENT IMAGE FILE HAVING A VERSION KEY AND A COLOR PLANE ASSOCIATED THEREWITH

Disclosed are systems and methods for compiling images for printing, and more particularly, combining a set of images into a single document image file having a version key and a color plane associated therewith so as to cause a raster image processor to select or ignore selected color planes in response to the version key and thereby enable printing of a plurality of multi-versioned documents from a common image file set.

BACKGROUND & SUMMARY

Printing processes utilize different technologies to transfer written content to various distribution media. Organizations using varying printing processes include modest-volume quick printers, book and financial publishers, newspaper companies, forms companies, all sizes of commercial printers (for advertising etc.), and, publication printers (for magazines and periodicals). These types of organizations may use an offset printing process whereby information is transferred from some original layout form to an intermediate aluminum or polyester plate material which is then "hung" on a standard printing press to enable multiple identical replication of that information on paper or some similar print media.

The offset process has conventionally been performed by optically creating a polyester film which contains the information, optically transferring the information from the film to a plate material by use of a light transfer or contact to a light-sensitive chemical emulsion which is bonded to the plate. The developed plate is then hung on a press in alignment, one plate for each color separation desired. The plates rotate along with the press cylinder and alternately come in contact with ink rollers and then an intermediate transfer blanket. The ink, which is accepted by the transfer blanket, then transfers the information to the paper during rotational contact.

Recently the development of computer-to-plate systems and high-quality digital printing systems has provided alternative printing options. A summary of such options, and the advantages of variable information enabled by the digital printing technology is described, for example, in the "Free-Flow Variable Information Workflow," white paper prepared by Interquest, Ltd. For Xerox Corporation (Copyright 2004 Xerox Corp.), which is hereby incorporated by reference in its entirety.

Regardless of whether an intermediate film is used to produce printing plates or whether they are imaged directly from computerized equipment, the information to produce the printing plates or color separations may be stored in sets of orthographic files that have been prepared with multiple layers of overlaid variable data. A set of such files may be processed in an offset printing workflow where different layers of color can be applied by separate offset printing plates to facilitate multiple versions of a printable image. The variable data for address one is overlaid with the data for address two, etc. The address placement is controlled by applying the appropriate color in the production process. The pages are done one at a time or imposed in sections.

After printing, there is a laborious manual process required to sort and collate the pages (or groups of pages) into the proper collection for the production of a version of one document of a multi-versioned set. Digital printing eliminates this need for manual sorting and collating.

In reference now to FIG. 9, an image file or set (600), containing the information needed to print a single image is shown. This file is broken down into different color planes, which correspond to the offset printing plates (610). Each plate contains a partial image containing only the parts of the image that correspond to a particular color of ink to be used. Each of the offset printing plates (610) is then used in sequence to print (620) multiple copies of the partial image it contains. Each partial image is sent back to the printer, in proper sequence, to have the next partial image contained in the next plate superimposed by the printer onto the image. The sequencing operation is shown by the arrows (630) that depict printed output being cycled back to the printer to have the next part of the image printed. Different degrees of manual intervention may be required to perform the proper sequencing of the print medium back to the printer for the next layer of color, depending on the complexity of the print job.

A known solution to the manual labor requirement inherent in offset printing is digital printing where the entire image, with all its colors, is printed at once. However, digital print quality has been traditionally perceived to be inferior to conventional offset printing by many consumers such as commercial advertisers, publishers and others. One cause of this perceived difference in quality may be that digital printing conventionally produces images using dry toner, while offset printing uses ink. Although the barrier between the two printing methods has been overcome there are particular applications in which one or both printing methods are appropriately employed. As will be described in more detail below, on such application is a large, variable-data, multi-version document (such as a workbook or teacher's guide, having information that may vary from state to state based on the varying curriculum). Documents of this sort may be economically produced in large runs using offset printing techniques. However, for purposes of proof or short runs, it may be advantageous to produce the documents using a digital printing system. In this situation, the printer would prefer to maintain the image information in a common format, so as to avoid having to reorder or edit the files used to compose the document for printing.

Because of these technological advances and the expectation of further advances to come, it is desirable to increase the use of digital printing technology, to eliminate the need for unnecessary labor, and to increase the productivity of the publishing process. Therefore, it is desirable to provide a digital system and method for compiling images for printing that can leverage the flexibility of digital technology while enabling existing conventional image information for offset printing orders to be utilized more efficiently.

According to aspects illustrated herein, there is provided a method for compiling images for a limited run of a document, comprising: selecting a set of computer readable images to be compiled; queuing the computer readable images into a memory; combining the computer readable images into a single first document image, said image including a version key and a color plane associated with said version key; sending said first document image to a digital front end processing system, said system using the version key to create a second image wherein said second image, in response to the version key, lacks at least one color plane of said first image; and sending said second image for rendering.

According to aspects illustrated herein, there is also provided a method for compiling images for printing comprising: using a computer to select a set of computer readable partial images to be compiled; using a computer to queue a set of computer readable partial images to be compiled; using a computer to combine a set of computer readable partial images into a single first image in portable data format comprising a version key and a color plane associated with said version key; sending said first image to a digital front end processing system; sending version key selection information to a digital front end processing system; using a selected version key to create a second image in portable data format that causes a raster image processor to ignore selected color planes of said first image based on a selected version key; and sending said second image to a raster image processor.

According to further aspects herein there is provided a system for compiling images for printing comprising: a set of computer readable partial images to be compiled; a computer comprising a display means, a user input device, a central processing unit and a data storage means; a computer program product comprising a computer readable file containing instructions that, when executed by a computer cause the computer to combine a set of computer readable partial images into a single image in portable data format the single image comprising a version key and a color plane associated with said version key; a digital front end processing system comprising a display means, a user input device, a central processing unit and a data storage means; a raster image processor; and a communication means coupled to a computer, a digital front end and a raster image processor.

BRIEF DESCRIPTION OF THE DRAWINGS

The drawings are only for purposes of illustrating an embodiment and are not to be construed as limiting, wherein:

FIG. 8 is an example of a version key selection information file; and

DETAILED DESCRIPTION

Figure 1:
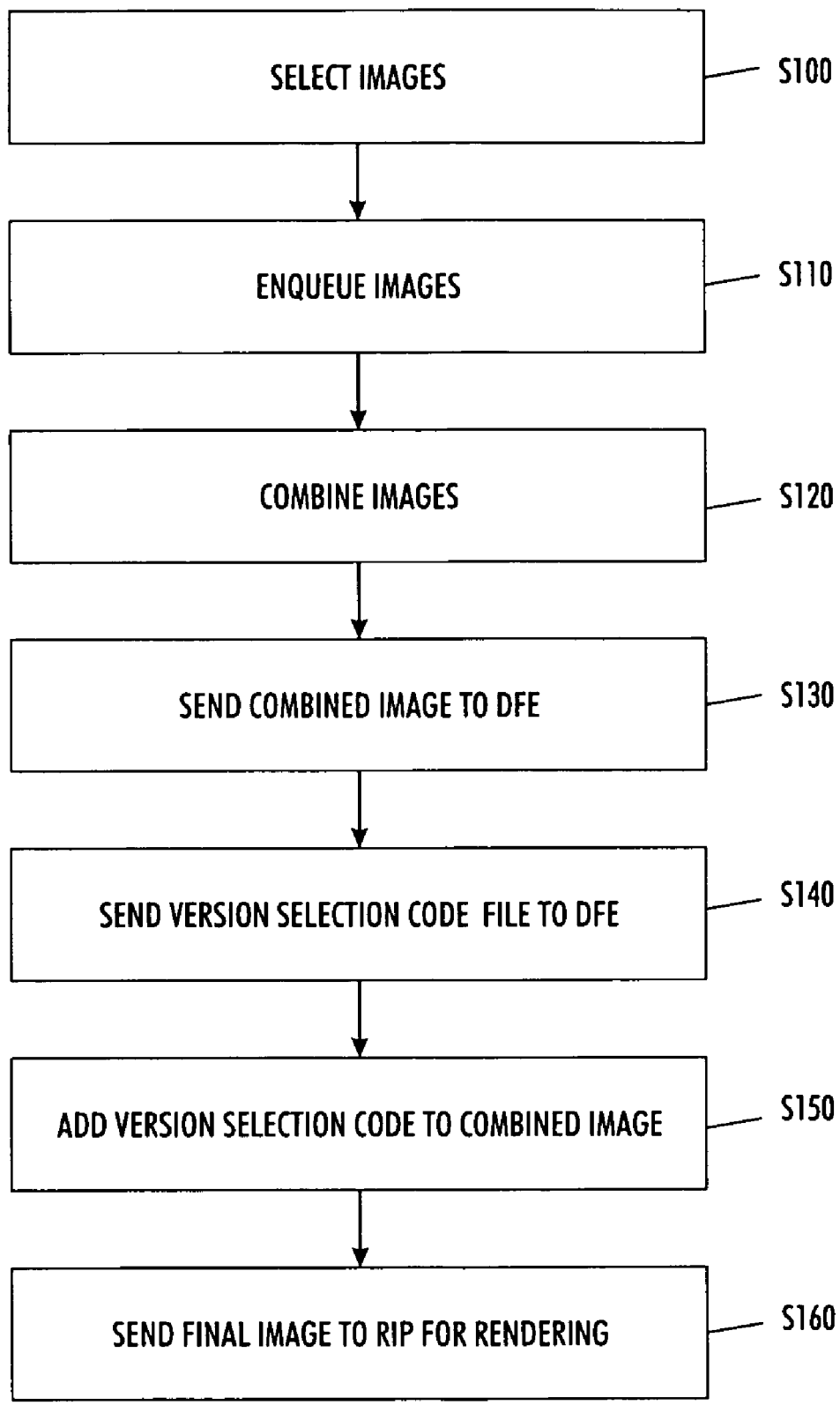
FIG. 1 illustrates steps of the method.

For a general understanding, reference is made to the drawings. In the drawings, like references have been used throughout to designate identical or equivalent elements. It is also noted that the drawings are not drawn to scale and that certain regions have been purposely drawn disproportionately so that the features and concepts could be properly illustrated.

Images to be processed may be in various digital forms and formats where the images and processing requirements may be set forth, such as object-oriented graphic formats (e.g. GRS), Portable Data Format (PDF) and other page description languages (PDLs). An offset printing publishing company may have many such files stored. Instead of using these image files individually to produce printing plates, these image files are combined into a single image file to control and prepare an entire document (e.g., workbook, textbook, etc.) for printing. In some applications, the offset printing company may maintain the list of files associated with a larger document in a spreadsheet or similar list. Such a list, for example in Table A below, may then be used to select the desired files when the document is to be printed.

TABLE A file://XServer/XRepo/XTest/Math_Gr1-1_MO/B_69101/A_69101/T01_69101_mo05.pdf
file://XServer/XRepo/XTest/Math_Gr1-1_MO/B_69101/A_69101/T02_69101_mo05.pdf
file://XServer/XRepo/XTest/Math_Gr1-1_MO/B_69101/A_69101/T03_69101_mo05.pdf
file://XServer/XRepo/XTest/Math_Gr1-1_MO/B_69101/A_69101/T04_69101_mo05.pdf
file://XServer/XRepo/XTest/Math_Gr1-1_05nat/B_10747/A_10747/T05_10747.pdf
file://XServer/XRepo/XTest/Math_Gr1-1_05nat/B_10747/A_10747/T06_10747.pdf
file://XServer/XRepo/XTest/Math_Gr1-1_05nat/B_10747/A_10747/T07_10747.pdf
file://XServer/XRepo/XTest/Math_Gr1-1_05nat/B_10747/A_10747/T08_10747.pdf
file://XServer/XRepo/XTest/Math_Gr1-1_05nat/B_10747/A_10747/T09_10747.pdf
file://XServer/XRepo/XTest/Math_Gr1-1_05nat/B_10747/A_10747/T10_10747.pdf
file://XServer/XRepo/XTest/Math_Gr1-1_MO/B_69101/A_69101/T11_69101_mo05.pdf
file://XServer/XRepo/XTest/Math_Gr1-1_05nat/B_10747/A_10747/T12_10747.pdf
file://XServer/XRepo/XTest/Math_Gr1-1_05nat/B_10747/A_10747/T13_10747.pdf
file://XServer/XRepo/XTest/Math_Gr1-1_05nat/B_10747/A_10747/T14_10747.pdf
file://XServer/XRepo/XTest/Math_Gr1-1_05nat/B_10747/A_10747/T15_10747.pdf
file://XServer/XRepo/XTest/Math_Gr1-1_MO/B_69101/A_69101/T16_69101_mo05.pdf
file://XServer/XRepo/XTest/Math_Gr1-1_05nat/B_10747/A_10747/T17_10747.pdf
file://XServer/XRepo/XTest/Math_Gr1-1_05nat/B_10747/A_10747/T18_10747.pdf
file://XServer/XRepo/XTest/Math_Gr1-1_05nat/B_10747/A_10747/T19_10747.pdf
file://XServer/XRepo/XTest/Math_Gr1-1_05nat/B_10747/A_10747/T20_10747.pdf
file://XServer/XRepo/XTest/Math_Gr1-1_05nat/B_10747/A_10747/T21_10747.pdf
file://XServer/XRepo/XTest/Math_Gr1-1_MO/B_69101/A_69101/T22_69101_mo05.pdf
file://XServer/XRepo/XTest/Math_Gr1-1_MO/B_69101/A_69101/T23_69101_mo05.pdf
file://XServer/XRepo/XTest/Math_Gr1-1_MO/B_69101/A_69101/T24_69101_mo05.pdf
file://XServer/XRepo/XTest/Math_Gr1-1_MO/B_69101/B_69101/T25_69101_mo05.pdf
file://XServer/XRepo/XTest/Math_Gr1-1_MO/B_69101/B_69101/T26_69101_mo05.pdf
file://XServer/XRepo/XTest/Math_Gr1-1_MO/B_69101/B_69101/T27_69101_mo05.pdf
file://XServer/XRepo/XTest/Math_Gr1-1_MO/B_69101/B_69101/T28_69101_mo05.pdf
file://XServer/XRepo/XTest/Math_Gr1-1_MO/B_69101/B_69101/T29_69101_mo05.pdf TABLE A-continued

```
file://XServer/XRepo/XTest/Math_Gr1-1__MO/B__69101/B__69101/T30__69101__mo05.pdf
file://XServer/XRepo/XTest/Math_Gr1-1__MO/B__69101/B__69101/T31__69101__mo05.pdf
file://XServer/XRepo/XTest/Math_Gr1-1__MO/B__69101/B__69101/T32__69101__mo05.pdf
file://XServer/XRepo/XTest/Math_Gr1-1__MO/B__69101/B__69101/T33__69101__mo05.pdf
file://XServer/XRepo/XTest/Math_Gr1-1__MO/B__69101/B__69101/T34__69101__mo05.pdf
file://XServer/XRepo/XTest/Math_Gr1-1__MO/B__69101/B__69101/T35__69101__mo05.pdf
file://XServer/XRepo/XTest/Math_Gr1-1__05nat/B__10747/B__10747/001A__5na10747.pdf
                                    .
                                    .
                                    .
file://XServer/XRepo/XTest/Math_Gr1-1__05nat/B__10747/E__10747/039__5na10747.pdf
file://XServer/XRepo/XTest/Math_Gr1-1__05nat/B__10747/E__10747/040__5na10747.pdf
file://XServer/XRepo/XTest/Math_Gr1-1__05nat/B__10747/E__10747/041__5na10747.pdf
file://XServer/XRepo/XTest/Math_Gr1-1__05nat/B__10747/E__10747/042__5na10747.pdf
file://XServer/XRepo/XTest/Math_Gr1-1__04nat/B__96201/E__96201/043A__23783.pdf
file://XServer/XRepo/XTest/Math_Gr1-1__04nat/B__96201/F__96201/043B__23783.pdf
                                    .
                                    .
                                    .
file://XServer/XRepo/XTest/Math_Gr1-1__04nat/B__96201/F__96201/045B__96201.pdf
file://XServer/XRepo/XTest/Math_Gr1-1__04nat/B__96201/F__96201/045__96201.pdf
file://XServer/XRepo/XTest/Math_Gr1-1__04nat/B__96201/F__96201/046__96201.pdf
file://XServer/XRepo/XTest/Math_Gr1-1__04nat/B__96201/F__96201/047A__96201.pdf
file://XServer/XRepo/XTest/Math_Gr1-1__04nat/B__96201/F__96201/047B__96201.pdf
file://XServer/XRepo/XTest/Math_Gr1-1__04nat/B__96201/F__96201/047__96201.pdf
file://XServer/XRepo/XTest/Math_Gr1-1__04nat/B__96201/F__96201/048__96201.pdf
file://XServer/XRepo/XTest/Math_Gr1-1__04nat/B__96201/F__96201/049A__96201.pdf
file://XServer/XRepo/XTest/Math_Gr1-1__04nat/B__96201/F__96201/049B__96201.pdf
file://XServer/XRepo/XTest/Math_Gr1-1__04nat/B__96201/F__96201/049__96201.pdf

file://XServer/XRepo/XTest/Math_Gr1-1__04nat/B__96201/I__96201/077B__96201.pdf
file://XServer/XRepo/XTest/Math_Gr1-1__04nat/B__96201/I__96201/077__96201.pdf
file://XServer/XRepo/XTest/Math_Gr1-1__04nat/B__96201/I__96201/078__96201.pdf
file://XServer/XRepo/XTest/Math_Gr1-1__04nat/B__96201/I__96201/079A__96201.pdf
file://XServer/XRepo/XTest/Math_Gr1-1__04nat/B__96201/I__96201/079B__96201.pdf
                                    .
                                    .
                                    .
file://XServer/XRepo/XTest/Math_Gr1-1__04nat/B__96201/I__96201/089Frev__23783.pdf
file://XServer/XRepo/XTest/Math_Gr1-1__04nat/B__96201/I__96201/089G__23783.pdf

file://XServer/XRepo/XTest/Math_Gr1-1__MO/B__69101/N__69101/D01__69101__mo05.pdf
file://XServer/XRepo/XTest/Math_Gr1-1__MO/B__69101/N__69101/D02__69101__mo05.pdf
file://XServer/XRepo/XTest/Math_Gr1-1__MO/B__69101/N__69101/D03__69101__mo05.pdf
file://XServer/XRepo/XTest/Math_Gr1-1__MO/B__69101/N__69101/D04__69101__mo05.pdf
file://XServer/XRepo/XTest/Math_Gr1-1__MO/B__69101/N__69101/D05__69101__mo05.pdf
file://XServer/XRepo/XTest/Math_Gr1-1__MO/B__69101/N__69101/D06__69101__mo05.pdf
file://XServer/XRepo/XTest/Math_Gr1-1__MO/B__69101/N__69101/D07__69101__mo05.pdf
file://XServer/XRepo/XTest/Math_Gr1-1__MO/B__69101/N__69101/D08__69101__mo05.pdf
file://XServer/XRepo/XTest/Math_Gr1-1__MO/B__69101/N__69101/D09__69101__mo05.pdf
file://XServer/XRepo/XTest/Math_Gr1-1__MO/B__69101/N__69101/D10__69101__mo05.pdf
file://XServer/XRepo/XTest/Math_Gr1-1__MO/B__69101/N__69101/D11__69101__mo05.pdf
file://XServer/XRepo/XTest/Math_Gr1-1__MO/B__69101/N__69101/D12__69101__mo05.pdf
```

In the exemplary partial listing of Table A, the name (e.g., "Math_XX", "nat" for National, and "MO" for Missouri) may or may not include spot colors (representing variable image data) in them. As will be described below, the spot colors are handled (separated) in accordance with the method described, so that the "Missouri files" will have state specific information.

In a general sense, the sorting and merging process involves taking the national files and merging in any state specific pages in place of the national page, if a state specific page exists (for the state being processed). The system and method described then separate the spot color for the state being processed out of the national (common) pages.

In reference now to FIG. 1, the image files that make up a set of print images for a document are selected (S100) and queued (S110) in a logical sequence using the methods further described below. After selection, the image files are combined (S120) into one composite, multi-version document file. The distinction between each of the image files is still logically maintained in the combined file by the use of separate color planes for each optional part and each required part of the complete image now combined into one file.

Once a combined image file with embedded color plane distinctions is created, it is sent to the digital front end processing system (S130). It is noted that the digital front end processing system may or may not be embedded in the same computer system that was used to combine the image files. If the two systems are separate, the image data may be transmitted using any network of any compatible type. Such a network would be one in which the transmitted combined digital image file would be received in a format that the digital front end software can process. If the first computer system for combining files and the digital front end processing system are not separate, but the digital front end is embedded as part of the first computer system, "sending" the combined image file would comprise moving it to a commonly accessible place in the storage memory of the first computer.

In order to properly process the combined image file, the digital front end processing system needs information on which variable image data, present in the combined file, should be printed. That information pertaining to the variable data is contained in a version key code file. The version key code file is sent (S140) to the digital front end processing system. It is noted that the digital front end processing system may or may not be embedded in the same computer system that contains a version key code file. If the two systems are separate, the version key code file may be transmitted using a network wherein the transmitted version key code file would arrive in a format that the digital front end software can process. If the two systems are not separate, but the digital front end is embedded as part of the computer system, "sending" the version key code file would again comprise moving it to a commonly accessible place in the storage memory of the common computer and invoking the digital front end software. It is further noted that several or all possible version key code files may alternately be already stored in the digital front end processing system, thus a step of "sending" the version key code file may be omitted.

Once the version key code file is present in the digital front end processing system along with a combined image file, the version key code file can be processed with the combined image file to produce the final desired image file. In the case where the combined image file employs Postscript® as the page definition language, the version key code file can comprise actual Postscript® code that can specifically override the "setcolorspace" operator to cause certain parts of the combined document to be omitted from printing. With Adobe® Postscript® as the page definition language then, the version key code file can simply be added (S150) to the combined image file to produce a final desired image file. This final image file is then sent (S160) to the raster image processor for rendering on the associated printing engine.

It is noted that the raster image processor may or may not be embedded in any of:
  (a) a first computer where the image files were combined;
  (b) a digital front end processing system; or
  (c) a printer, such as a xerographic printer.

The raster image processor translates the page definition language into actual locations where a dot or pixel should be printed. This rasterization information is then transmitted directly to the printing device that prints the dots or pixels on a substrate or similar medium.

In reference now to the embodiments of FIGS. 2 through 5, the following items are depicted:
  a computer 200 for combining image files 280;
  a software driven digital front end (DFE) processing system 210;
  a data flow between digital front end 210 and the combined image file 215;
  a software tool 220 to combine image files into one composite, multi-version document file;
  a data flow between image combining software tool and image files 225;
  a display and user input devices (230) of both the computer system for combining images and the digital front end processing system;
  a combined image file 240;
  a data flow 245 between the image files and the combined image file;
  a raster image processor 250;
  a data flow 255 between the digital front end processing system and the raster image processor;
  a printer or other output rendering device 260;
  data flow 265 between raster image processing software and the printer; printed output 270;
  a data flow 275 from the printer to the printed medium;
  image files 280 to be combined;
  a digital front end processing system 290;
  a data flow between the version key code file and the software of the digital front end processing system 295; and
  a version key code file 300.

Figure 2:
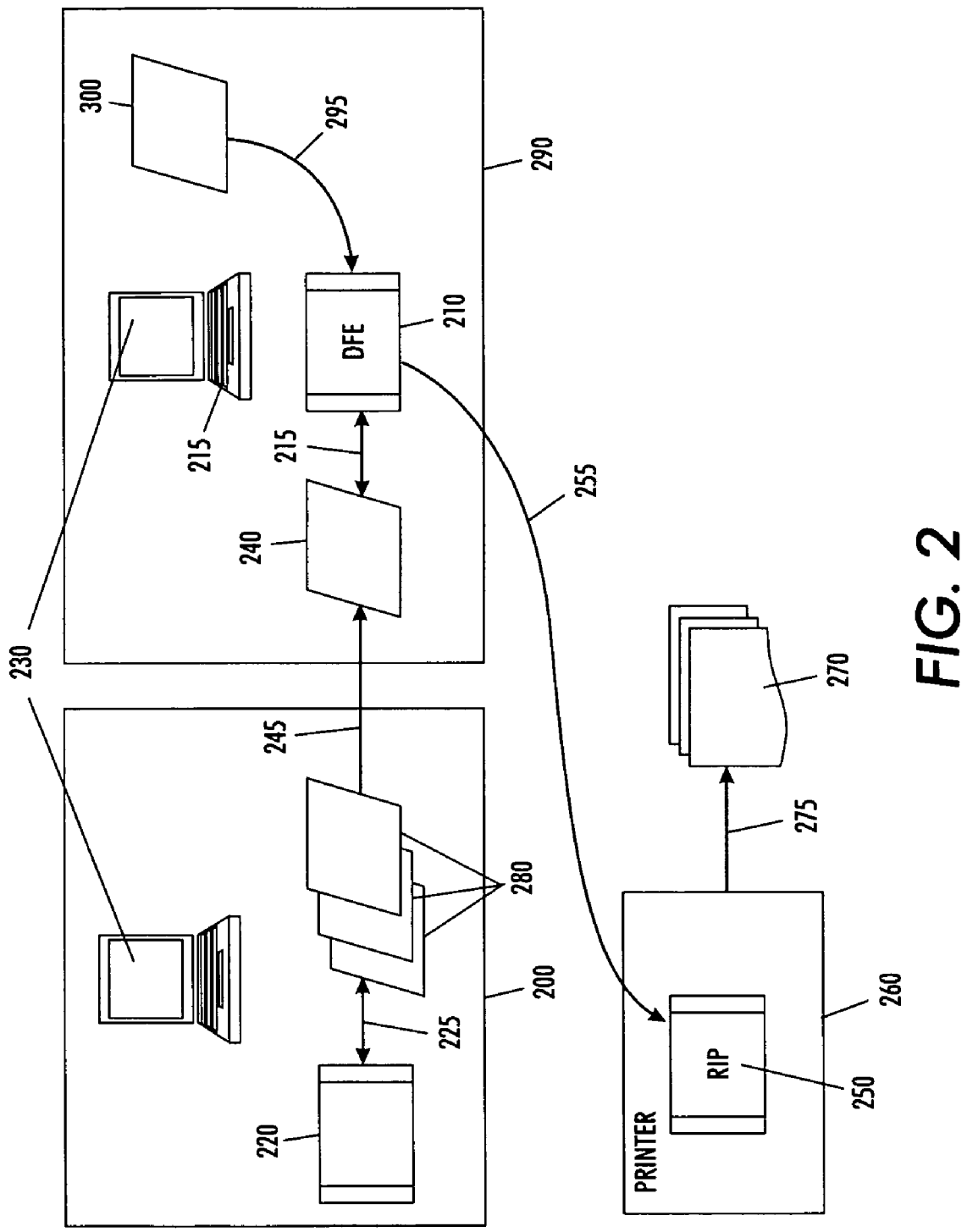
FIG. 2 illustrates a flow of information in a printing workflow.

In reference now specifically to FIG. 2, the computer 200 for combining image files comprises an image combining software tool 220. In one embodiment, the computers referenced herein include a display or similar means for presenting information to a user, a user input device (e.g., keyboard, mouse or similar pointing device, audible input receiver (microphone), touch screen, touch pad or the like), a central processing unit, and a data storage or similar memory subsystem. This tool may be invoked by user input and may interact with the user using the conventional display and input device 230 of the computer. An exemplary computer platform and associated software may include the Xerox DocuSP™ system. The image combining software may also be invoked automatically by another process. The image combining software tool 220 retrieves data 225 from the image files 280 selected by the user or by a process that automatically invokes the software tool 220.

A combined image file 240, assembled by the software tool 220, from multiple image files 280, is sent to the digital front end processing system 290. The digital front end software 210 processes the combined image file 240 in accordance with the version key code file 300 selected. It is noted that the version key code file 300 may be stored or resident in the computer memory of the digital front end processing system 290 or it may be transmitted from the computer 200 used to combine the image files 280. It is noted that all possible version key code files 300 may already be stored in the digital front end processing system 290, thus a step of "sending" the version key code file 300 from the computer 200 used to combine image files, may be omitted.

Once the version key code file 300 is available to the digital front end processing system 290 along with a combined image file 240, the combined image file 240 can be processed in accordance with the version key code file 300 to produce the final desired image file. In the case where the combined image file 240 uses Postscript® as the page definition language, the version key code file 300 can comprise actual Postscript® code to control (e.g., specifically override) the "setcolorspace" operator to cause certain parts of the combined document 240 to be omitted from printing. With Adobe® Postscript® as the page definition language then, the version key code file 300 can simply be added to the combined image file 240 to produce a final desired image file. This final image file is then sent 255 to the raster image processor 250.

It is noted that conventional raster image processors 250 may include computer software, computer firmware or computer hardware in any combination. An example of such a computer platform may be the Xerox DocuSP® 6000XC Color Controller. In FIG. 2, the raster image processor 250 resides in a xerographic printer 260. The raster image processor may have Postscript® as its page definition language. If so, it will be able to process the combined image file 240 if the combined file 240 also has Postscript® as its page definition language. As has been described above, the version key code file 300 may be a simple code file that, when added to the combined image file 240, will control or override selected color spaces causing only the desired part or parts of the combined image file to be rasterized by the raster image processor 250. The raster image processor 250 sends the rasterized image directly to a printing device 260. The printing device 260 may be a xerographic printer or other printing device (e.g., solid and liquid ink jet, such as Xerox Phaser™ 8400) suitable for the rendering of rasterized images on a substrate or similar display medium. The printing device 260 then, prints images directly on the print medium 270.

Figure 3:
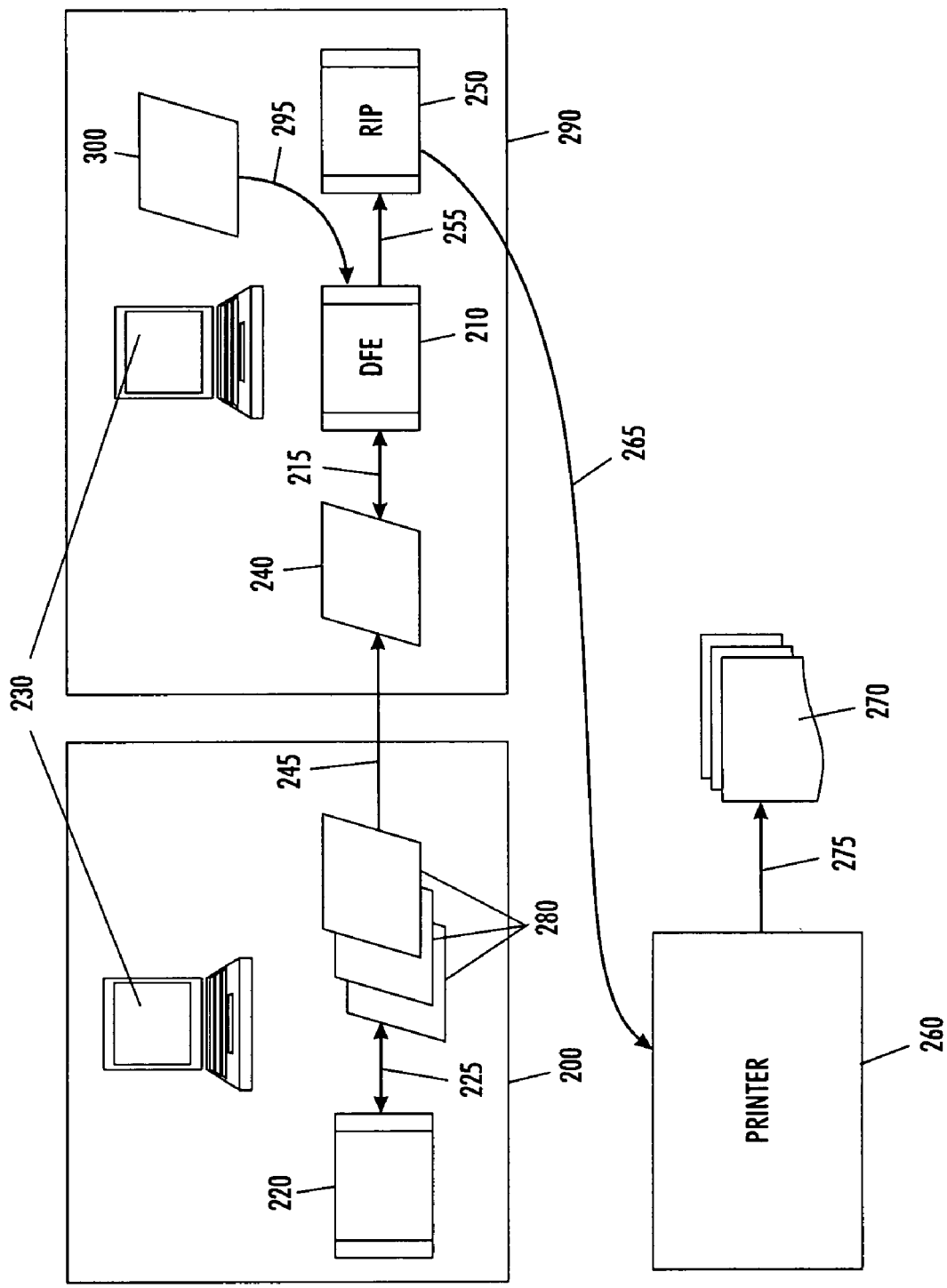
FIG. 3 illustrates an alternate flow of information in a printing workflow.

In reference now to FIG. 3, a similar embodiment to that described in FIG. 2 is now depicted with the following changes:
  (a) the raster image processor 250 is now embedded in the digital front end processing system 290;
  (b) rasterized images are not sent directly to the printing device 260 but must travel through a compatible network where a compatible network is any network that can perform such transmissions without causing any change to the image data, and may include a direct or dedicated network connection; and
  (c) communication between the digital front end processing system 290 and the raster image processor 250 takes place internally in the digital front end processing system 290.

In the embodiment of FIG. 3, it will be apparent that in such a distributed system, printer 260 may receive RIPped input for rendering from one or more of a plurality of systems, so that the operation of the printer may be maximized and not limited by the processing capacity of a dedicated digital front end 210 and raster image processing 250 components.

Figure 4:
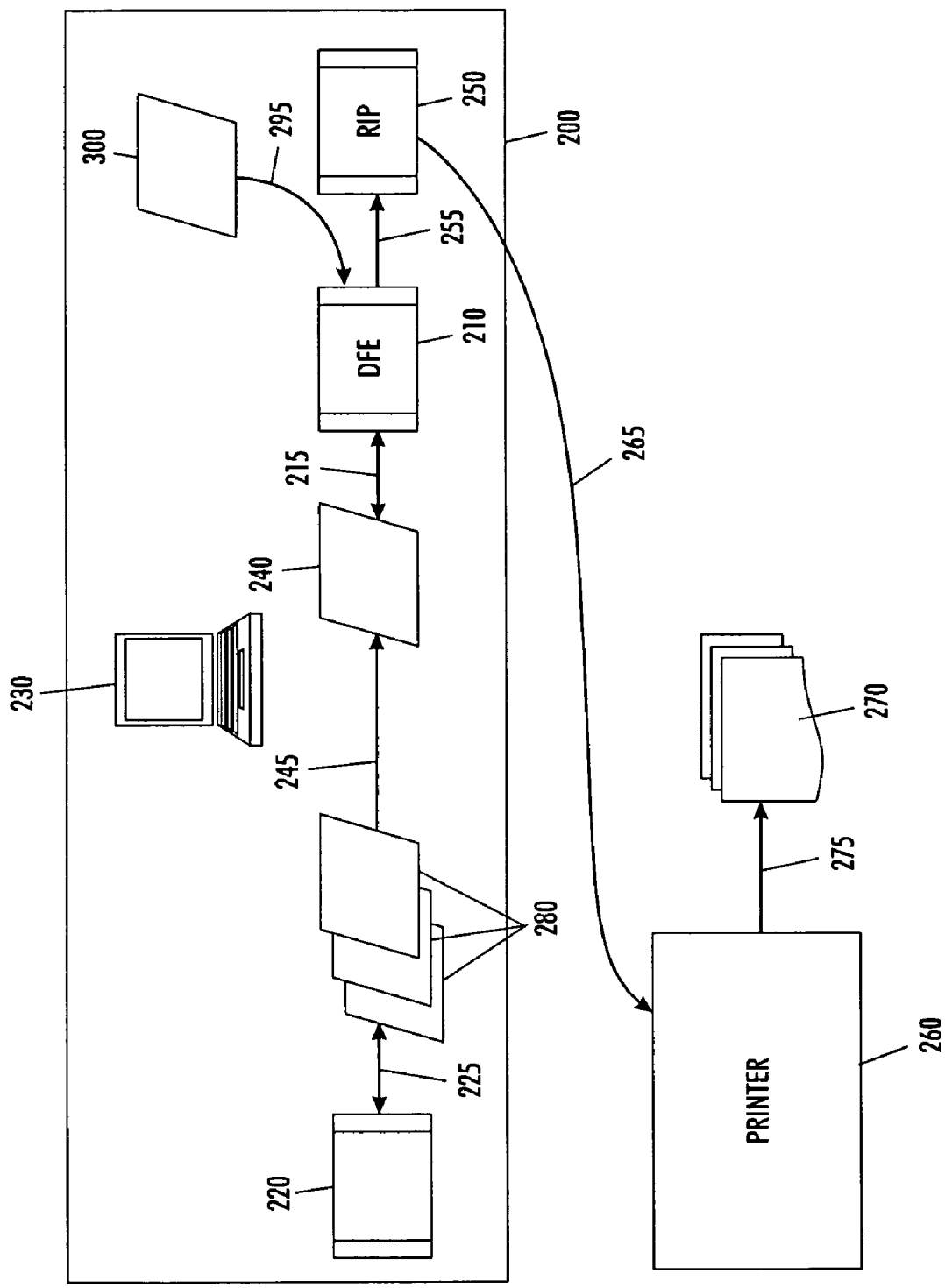
FIG. 4 illustrates yet another alternate flow of information in a printing workflow.

In reference now to FIG. 4, the digital front end processing system is missing because the software of the digital front end processing system 210 is embedded in the computer used to combine images 200. The computer used to combine images 200 takes over the functions that were performed by the separate digital front end processing system 290. Aside from this change, the embodiment of FIG. 4 is similar to the embodiments of FIGS. 2 and 3.

Figure 5:
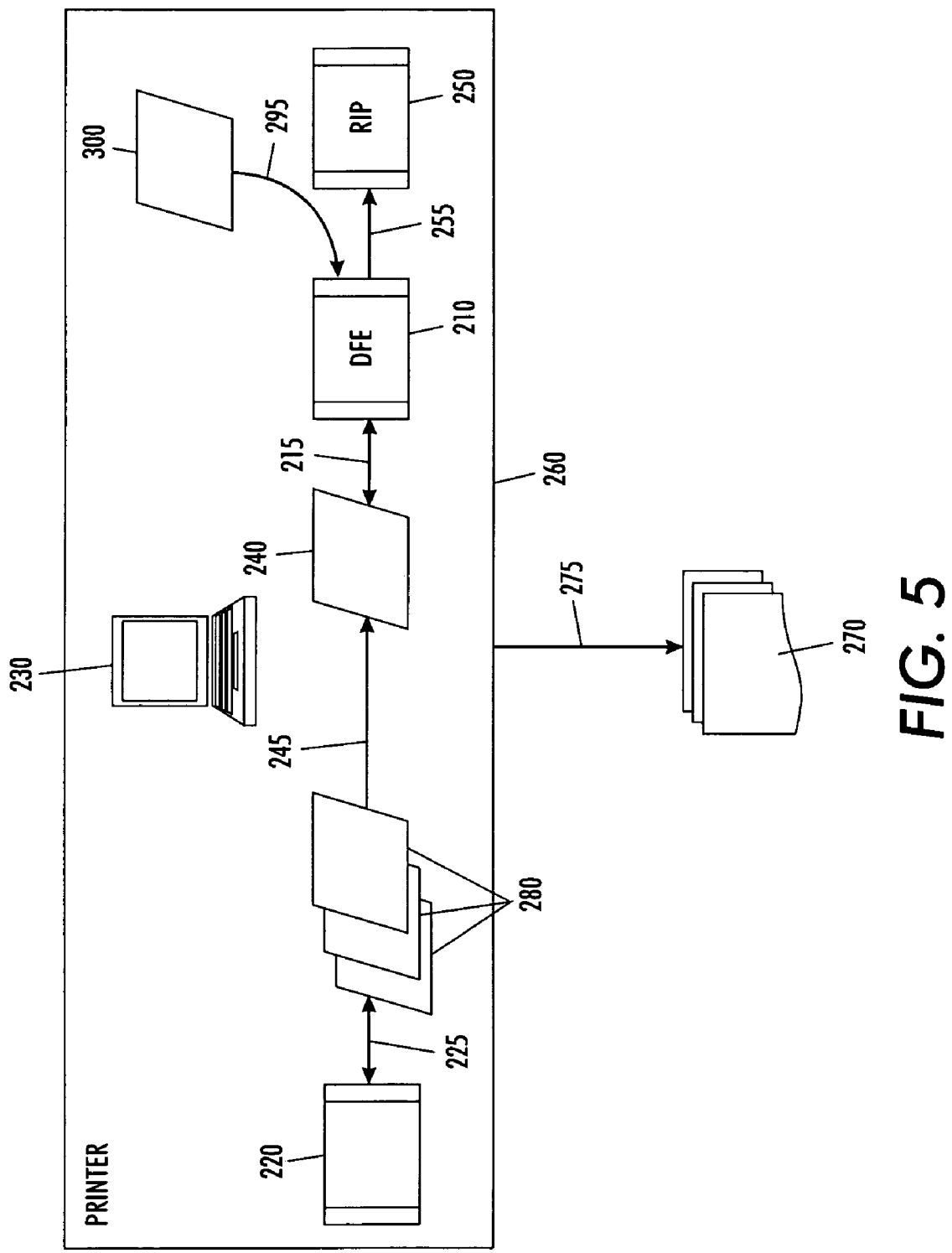
FIG. 5 illustrates yet another alternate flow of information in a printing workflow.

In reference now to FIG. 5, the elements already described in FIGS. 2–4 are again depicted. However, the computer used to combine image files 200 is missing along with the digital front end processing system 290. The reason for this is that all the elements that were embedded in the computer used to combine image files and the digital front end processing system are, in this embodiment, all embedded within printer 260. Of necessity this requires the printing device (260) to include the proper computer hardware (processor(s), memory, digital data storage medium, etc.) necessary to properly execute the software used to combine image files 220, the software of the digital front end processing system (210) and the raster image processor 250 as well as other hardware necessary for the printing function.

Figure 6:
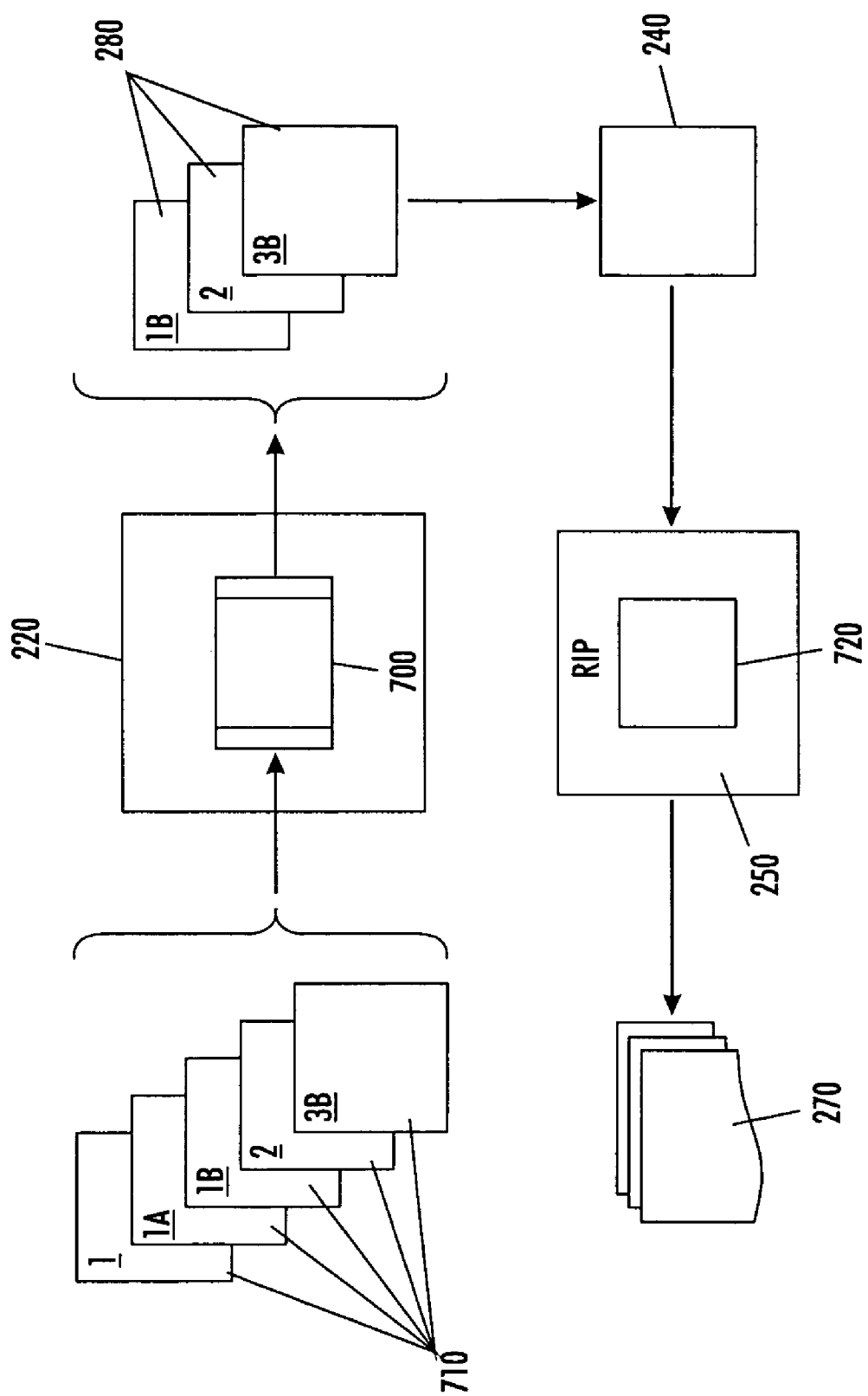
FIG. 6 illustrates a process of compiling to be printed.

Referring now to FIG. 6, separate image files 710 are stored in a computer system. The software tool 220 to combine image files contains a module 700 that facilitates selection of a set of image files 280 to be combined. The separate image files are indicated in FIG. 6 with 1, 1A, 1B, 2, 3B. The set 280 of image files to be combined are marked in the drawing with 1B, 2, 3B. The marks show that the set 280 of image files to be combined is a subset of the separate image files 710 stored in a computer system. As represented in Table A above, the image files that have no alphabetic reference may represent the standard or "national" document image files, whereas the state-specific files may be designed by the "A" (e.g., MO), "B" or similar designations.

As previously described, version key information embedded in the combined image file 240 is used by the raster image processor 250 to create the final image to be printed 720. The final image is an image that omits those parts of the combined image file 240 that were not selected by the version key information embedded in that combined image file 240. The raster image processor 250 sends the print image directly to a printer 260 (e.g., FIG. 4) or other output device, which produces the printed output 270.

Figure 7:
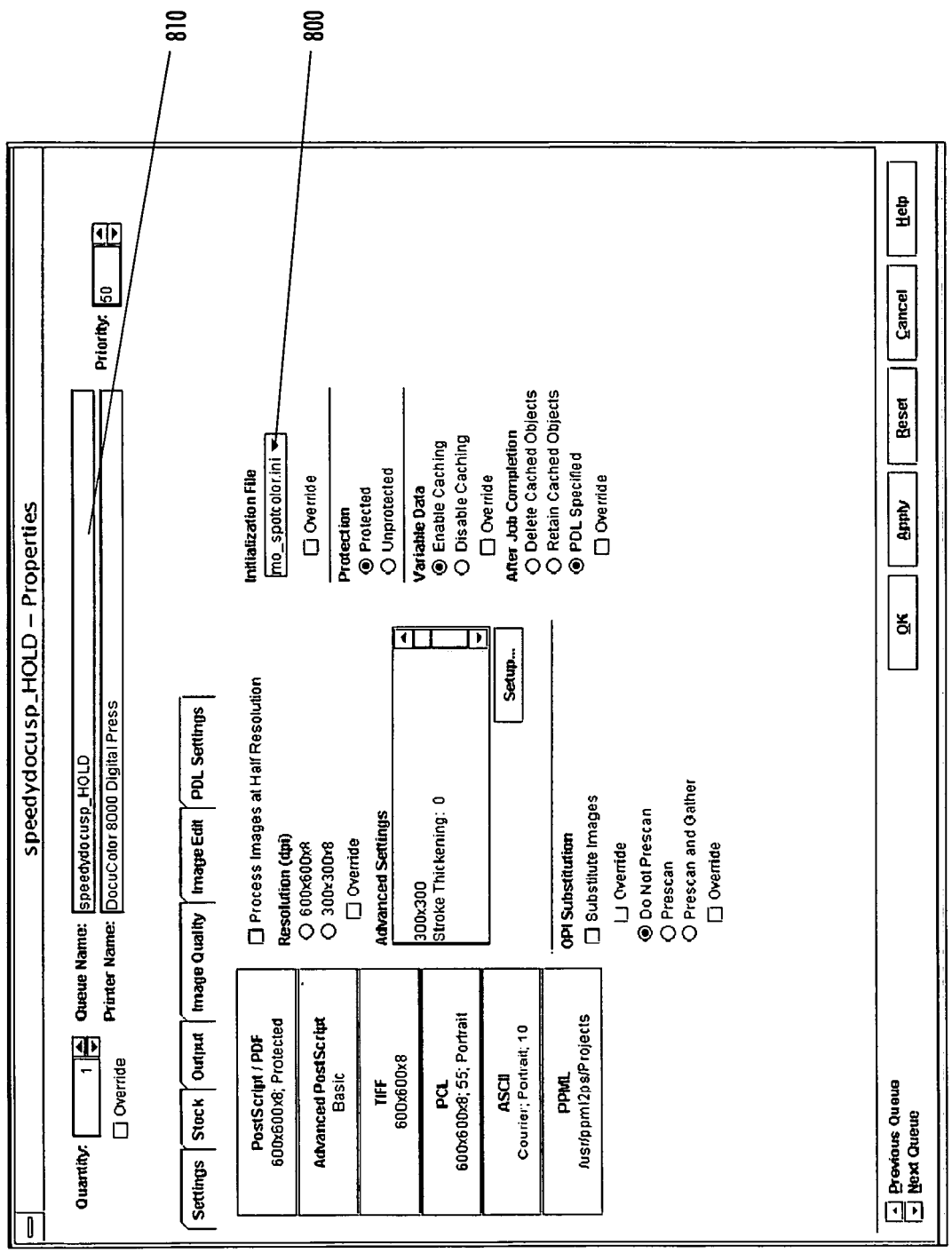
FIG. 7 illustrates a means of interaction between a user and a digital front end system.
Figure 9:
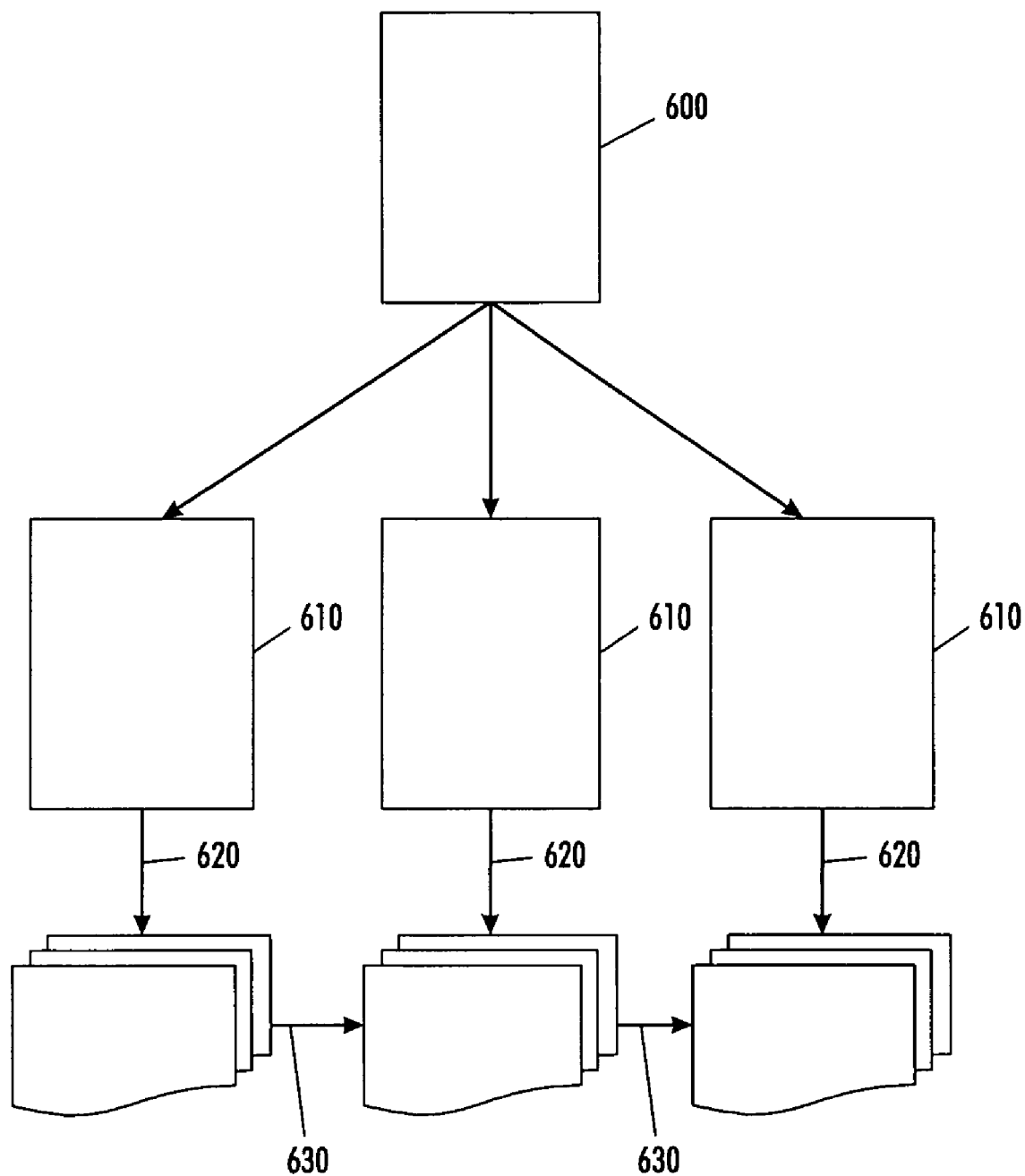
FIG. 9 illustrates a conventional offset printing workflow.

In reference now to FIG. 7, a sample interface screen for user interaction with a digital front end processing system is shown. The screen layout would allow a user to specify, in field 800, the name of the version key code file in the "initialization file" field to be used in processing a set of image files. The set of image files, at the point of this sample interaction, has already been combined into one file and is submitted to a queue by the name "speedydocusp_HOLD" as designated in the "Queue Name" field 810.

Referring now to FIG. 8 in conjunction with FIG. 7, a sample of a version key code file (mo_spotcolor.ini) in the Postscript® page definition language is shown. According to the embedded comments in this sample file, a color plane has been defined in the combined image file named "mo_magenta." The code in the version key code file instructs the raster image processor to rasterize for print only the image data found in the "mo_magenta" color plane, thereby permitting the rasterized output to include version specific images as selected from the multi-version document It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for compiling images for printing of a variable data document from a multi-versioned document, comprising:
  selecting a set of computer readable images to be compiled;
  queuing the computer readable images in a memory;
  combining the computer readable images into a single first document image, said first document image including a version key and a color plane associated with said version key;
  sending said first document image to a processing system, said processing system using the version key to create a second image wherein said second image, in response to the version key, lacks at least one of said computer readable images in said first document image; and
  sending said second image for rendering.

2. The method of claim 1, further comprising:
  sending said first document image to a processing system, said processing system using a second version key to create a third image wherein said third image, in response to the second version key, lacks another one of said computer readable images in said second document image; and
  sending said third image for rendering.

3. The method of claim 2, wherein said rendering operation produces at least two different document versions.

4. A method for compiling images for printing comprising:
- using a computer to select a set of computer readable partial images to be compiled;
- using a computer to queue a set of computer readable partial images to be compiled;
- using a computer to combine a set of computer readable partial images into a single first image in portable data format comprising a version key and a color plane associated with said version key;
- sending said first image to a digital front end processing system;
- sending version key selection information to a digital front end processing system;
- using a selected version key to create a second image in portable data format that causes a raster image processor to ignore selected color planes of said first image based on a selected version key; and
- sending said second image to a raster image processor.

5. The method of claim 4 wherein the set of partial images includes information for creating an offset printing image.

6. The method of claim 4 wherein the computer used to process a set of partial images is a digital computer system comprising a display, a user input device, a central processing unit and data storage.

7. The method of claim 4 wherein the digital front end processing system is a digital computer system comprising a display, a user input device, a central processing unit and data storage.

8. The method of claim 7 wherein the version key selection information is in a computer readable file.

9. The method of claim 8 wherein the computer readable file further comprises page definition language commands.

10. The method of claim 8 wherein the digital front end processing system allows the user to associate the file name of a version key file comprising page definition language commands for processing with a portable data format file comprising said second image by a raster image processor.

11. The method of claim 4 wherein said second image omits those parts of the first image that were not selected by the version key.

12. A system for compiling images for printing, comprising:
- a set of partial images to be compiled, said partial images including variable information therein wherein the set of partial images includes color separation information;
- a computer comprising a display, user input device, a central processing unit and data storage, said computer operating in response to a set of pre-programmed instructions to combine the set of partial images into a single document image, the single document image including a version key;
- a raster image processor, for further processing of the single document image so as to produce a rasterized image suitable for printing, said rasterized image including a representation of the variable information yet omitting a portion of the single document image in response to the version key.

13. The system of claim 12 wherein the computer further comprises a digital front end processing system.

14. The system of claim 13 wherein the digital front end processing system includes a user interface and where the interface enables the user to associate the file name of a version key file comprising commands for processing the single document image.

15. The system of claim 14 wherein the digital front end processing system allows the user to select a page definition language.

16. The system of claim 12, further comprising a printer for rendering the document in response to the rasterized image.

17. The system of claim 16, wherein the raster image processor is embedded in the printer.

18. The system of claim 17, wherein the digital front end processing system is embedded in the printer.

* * * * *